US006476826B1

(12) United States Patent
Plotkin et al.

(10) Patent No.: US 6,476,826 B1
(45) Date of Patent: Nov. 5, 2002

(54) INTEGRATED SYSTEM AND METHOD FOR PROCESSING VIDEO

(75) Inventors: Robert C. Plotkin, Dobbs Ferry, NY (US); Jonathan Katz, Sands Point, NY (US); Nathan Leight, New York, NY (US)

(73) Assignee: VastVideo, Inc., Astoria, NY (US)

( * ) Notice: Subject to any disclaimer, the term of this patent is extended or adjusted under 35 U.S.C. 154(b) by 114 days.

(21) Appl. No.: 09/643,255

(22) Filed: Aug. 22, 2000

(51) Int. Cl.[7] ............................................. G06F 15/00
(52) U.S. Cl. ..................................... 345/723; 345/716
(58) Field of Search ................................ 345/700, 716, 345/723, 762, 744; 348/6, 8, 10, 12

(56) References Cited

U.S. PATENT DOCUMENTS

| 5,537,528 A | * | 7/1996 | Takahashi et al. | 345/429 |
| 5,553,281 A | * | 9/1996 | Brown et al. | 707/206 |
| 5,852,435 A | * | 12/1998 | Vigneaux et al. | 345/723 |
| 6,011,562 A | * | 1/2000 | Gagne | 345/473 |
| 6,032,156 A | * | 2/2000 | Marcus | 707/104 |

* cited by examiner

*Primary Examiner*—Cao H. Nguyen
(74) *Attorney, Agent, or Firm*—Fleshner & Kim, LLP

(57) ABSTRACT

A system and method is provided that can integrate a set of video processing systems for the purpose of increasing productivity and throughput. The integrated system edits video into clips, automatically adds records corresponding to these clips in a centralized database system, adds information about the content of these clips into these records, and controls the compression or conversion of these clips for distribution. The database system is used for managing the clips as well as for the searching of the clips based primarily on the content information added in the above process. Using this process, a digital production line may be built that allows video editors to edit sections from a video tape, have these sections (or clips) be dynamically added to a database system, and provide a mechanism for the editors to apply meta-information to the newly created clips at the same time the clips have been authored. Also, this system provides for the automatic processing of the edited material into alternate formats for such purposes as Internet streaming. The combination of these processes provides significant improvement productivity in the generation of clips, such as video highlights, from complete video.

30 Claims, 4 Drawing Sheets

INTEGRATED SYSTEM AND METHOD FOR PROCESSING VIDEO

BACKGROUND OF THE INVENTION

1. Field of the Invention

This invention generally relates to processing video information, and more particularly to an integrated system and method for generating video clips for distribution over a network such as the Internet.

2. Background Description

A number of technologies exist for performing video editing, video archiving, and video format conversion and compression. Unfortunately, none of these technologies are integrated, i.e., each of the video editing, archiving, and formatting functions are performed by an independent system. Consequently, video production has proven to be an inefficient, time-consuming endeavor.

These drawbacks are apparent from the many types of video processing equipment available on the market. Currently, video editing systems are made by Avid or Media 100. Software for converting or compressing video into various formats are available from Terran Corporation, RealNetworks, or Microsoft. And, database systems are made by IBM, Oracle, and Microsoft. These database systems come equipped with interfaces that allow users to associate meta-information with the stored video.

Unlike the present invention, all of these conventional video processing devices operate independently from one another and thus are employed as separate workstations often remotely located from one another. For example, video clips may be generated at one location by one user and then forwarded to another location to be processed by a second users. The use of separate, unlinked workstations and multiple users to perform the steps required to generate and process video clips in a video production system has proven to be undesirable in terms of time, convenience, and cost.

Second-generation video processing equipment integrate simple video logging features with database systems. For example, they perform rudimentary selection of video and association of meta-information. Virage and Excalibur's Screening Room are examples of systems of this type.

One drawback of second-generation equipment is that they are designed for automatic operation and do not provide a true editing environment that enables users to selectively build video clips, or sequences, from a complete video. Instead, these systems dynamically build a list of sequential clips from the complete video.

Also, these systems do not provide for the user-based addition of meta-information. Instead, they rely on automated systems to retrieve information such as closed-captioning. Their primary purpose is to log content within a video title for the retrieval of that section of the full video, or for the retrieval of the complete video. For instance, in a news gathering environment news material may be run through one of these systems where the individual stories will be logged with extracted close-captioned text. This allows for the retrieval and searching of a collection of this material for the purposes of locating a specific story or identifying a complete tape for re-use. However, user-selective meta-tagging with content information is not possible and thus these second-generation systems are only of limited use in video systems that require, for example, the distribution of streaming video over the Internet.

A need therefore exists for a video production system which processes video in a more efficient manner compared with conventional systems, and which achieves this efficiency by linking the video editing, meta-tagging, database accessing, and conversion/compression elements of a video production system into a single integrated unit.

SUMMARY OF THE INVENTION

It is a first object of the present invention to provide a system and method which links the video editing, database access, meta-tagging, and conversion/compression elements of a video processing system into a single integrated unit, thereby improving video production efficiency compared with conventional systems.

It is another object of the present invention to achieve the first object by brining the traditionally independent video editing, database access, meta-tagging, and compression elements of a video processing system under control of a central software application which can be accessed through a graphical user interface displayed, for example, at a video editing station.

It is another object of the present invention to integrate the elements of a video processing system in the aforementioned manner to create a digital pipeline which enhances workflow productivity, because the users who have knowledge of the video clips they are editing are able to store content information with the clips in a centralized storage system. Once stored, the system can be used to select clips from storage for distribution as, for example, streaming video over the Internet.

It is another object of the present invention to form the aforementioned integrated video production system from video editing, database access, and video conversion/compression devices that are remotely located from one another.

It is another object of the present invention to provide an integrated video production system and method which allows a single user to perform, or control the performance, of all the steps required to process a video clip from generation to distribution, even if the individual elements of the video production system are remotely located from one another.

It is another object of the present invention to provide a system and method of the aforementioned type which allows a user to selectively building video clips from a complete video.

It is another object of the present invention to provide a system and method of the aforementioned type which performs user-based addition of contextual information to the video clips generated for storage and distribution.

It is another object of the present invention to reduce the overall time to create video clips from a complete video title, while simultaneously adding meta-information to the clips which characterizes the content of the clips with improved accuracy and relevancy compared with conventional systems.

These and other objects are achieved by performing, in a single integrated system and in a continuous manner, all the steps required to process a video clip (or sequence) from generation to distribution, even if the individual elements of the video production system are remotely located from one another. This is realized by using a control application program which links the elements of a video production system using managed network connections. To provide enhanced control, a graphical user interface is presented at a video editing workstation for displaying video clips and then tagging the clips with content information to be subsequently stored in a database. The system may then be word searched to locate specific clips based on the content information. Once located, the content information (e.g., meta-tags) may either be modified, replaced, or deleted, and/or the clips may be distributed, for example, over the Internet as streaming video. Thus, unlike conventional systems, the method of the present invention allows a single user to perform, or control the performance, of all the video production functions required to ready a video clip for distribution.

In a preferred embodiment, the system of the present invention includes: a first video editing device which generates a video clip from a video; a storage area network, linked to the first video editing device, for storing the video or video clip; a content assignment program for displaying the video clip and allowing a user to tag the video clip with content information; a content management database which stores a record that includes the content information tagged to the video clip by the context assignment means; and a control application program for operatively linking the first video editing device, context assignment program, storage area network, and content management database to form an integrated video-clip storage and distribution system. If desired, at least two of the elements of the system may be remotely located from one another. Further, the content assignment program may be included in the video editing device for convenience purposes and to centralize the functions of the system, and the The system of the present invention may be equipped with a number of optional features. For example, the system may include a module for converting or compressing video clip into predetermined formats, e.g., a streaming video format. The system may include a video loading system included within the video editing device or as a separate element. If separate, the video loading system would be responsible for inputting the video into the storage area network.

Further, and advantageously, the control application program may be written to automatically create a record in the content management system corresponding to the video when the video is loaded into said video loading device. The control application program may also automatically activate the content assignment program and display of a graphical user interface when video is loaded into the video loading device. Both of these steps further enhance the speed and efficiency of the meta-tagging process and thus further underscore the advantages of the present invention.

Further, the system may include a browser program for searching the storage area network to locate video clips based on the content information input into the content management database.

DETAILED DESCRIPTION OF A PREFERRED EMBODIMENT OF THE INVENTION

The present invention is an integrated video production system which allows a single user to perform, or control the performance, of all the steps required to process a video clip (or sequence) from generation to distribution, even if the individual elements of the video production system are remotely located from one another. The invention achieves these advantages by using a control application program to link the elements of a video production system using managed network connections. To provide enhanced control, a graphical user interface is presented at a video editing workstation for displaying video clips and for then tagging the clips with content information for storage in a database. The system may then be word searched to locate specific clips based on the content information. Once located, the content information (e.g., meta-tags) may either be modified, replaced, or deleted, and/or the clips may be distributed, for example, over the Internet as streaming video.

Figure 1:
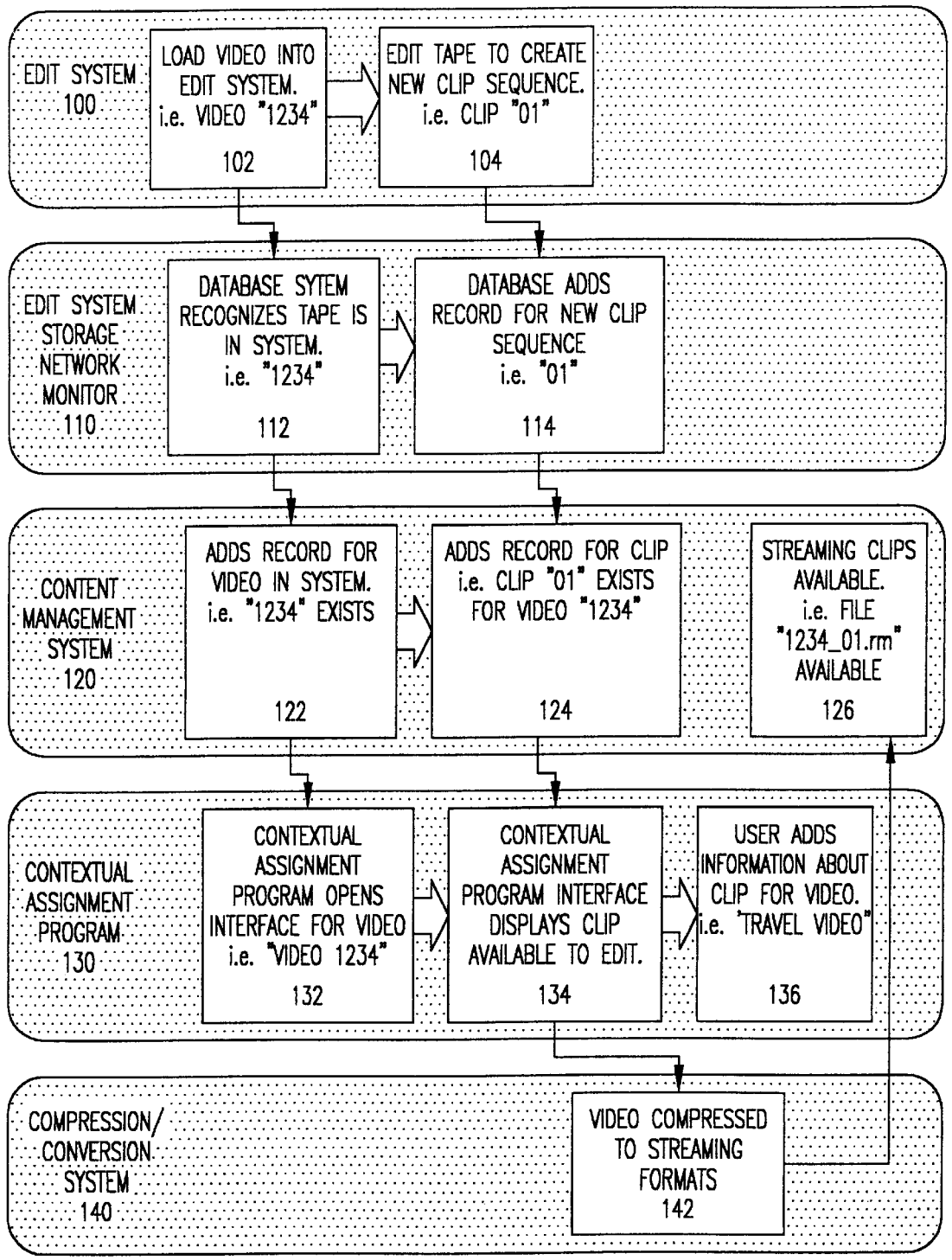
FIG. 1 is a conceptual diagram of a preferred embodiment of the system of the present invention, and steps performed by that embodiment in accordance with the method of the present invention.

Referring to FIG. 1, a preferred embodiment of the system of the present invention includes a video editing system 100, a storage area network (SAN) 110, a centralized database that is used as a content management system 120, a contextual assignment application program 130 for assigning meta-information to video clips, and a compression or conversion system 140. The video editing system may be an Avid NewscutterXP system, the SAN may be the Avid Unity system, and the centralized database in the content management system may be an Oracle database.

The system also includes a control application program (not shown) which links these elements (in the manner indicated by the process flow arrows in FIG. 1) to form an integrated video production system. Through this control application program, tight synchronization is achieved between the operation of the editing system and the contextual assignment program, as well as the other elements in the system. Synchronizing these elements advantageously establishes a workflow for processing video that yields relevant and accurate information about the clips to be stored in the content management database 120. This improved accuracy is realized by having the user who edited the video clips be the one who also assigns content information to the clips, at a time nearly instantaneously after creation of the clips. In at least this way, the present invention represents a significant improvement over conventional systems.

By way of comparison, conventional video production systems require video be edited and completed, and then at some later date, have content information about the video associated with them. Alternative conventional systems rely on automatic methods for this contextual assignment. These methods are neither accurate nor extensive enough to allow for general-purpose use. For instance, they may be used for special areas of video such as news, where ancillary information, such as closed captioning is readily available. Even in this case, however, the automated systems simply record information from the video or video segments. The present invention, on the other hand, is suitable for general-purpose use in processing video of virtually any topic with content information.

The process flow of the embodiment shown in FIG. 1 will now be described. When an editor loads a video tape 102 into a video load system, the SAN recognizes the existence of this video 112. The content management system 120 then automatically creates a record 122 in the content management database corresponding to the video. For example, this record may identify the video as "Video 1234." The automatic creation of this record may be performed by customized middleware created for the Oracle database used to implement the content management database. This middleware may also be written to handle other data flow operations into and out of the database, as well as the interaction of the content management database with the other elements in the system.

After a record has been created in the content management system for the newly loaded video, the record may be automatically made available for meta-tagging 132 by the contextual assignment program 130. This may be accomplished by presenting a graphical user interface on the video editing system which is specially designed to allow a user to link content information with video clips derived from the loaded video, to be explained in greater detail below.

The method continues with the step of allowing a user to create a clip (or sequence) 104 from the loaded video at the video editing system. This is performed in a conventional manner based on the specific video editing system being used.

Once the clip is created, the SAN manager generates a record 114 for the clip, and the content management system creates a record 124 (e.g., "Video 1234.01") for this clip as well. The contextual assignment program, or tagging software, 130 then presents the aforementioned graphical user interface to the user on a display of the video editing system. Preferably, the graphical user interface is equipped with a video clip viewer for displaying the clip 134 to the user. The user then uses the interface to input content information 136 relating to the video into the record created in the content management system in step 122. If the video clip concerns travel, the user may, for example, input "travel video" as content information into the record corresponding to "Video 1234."

Figure 2:
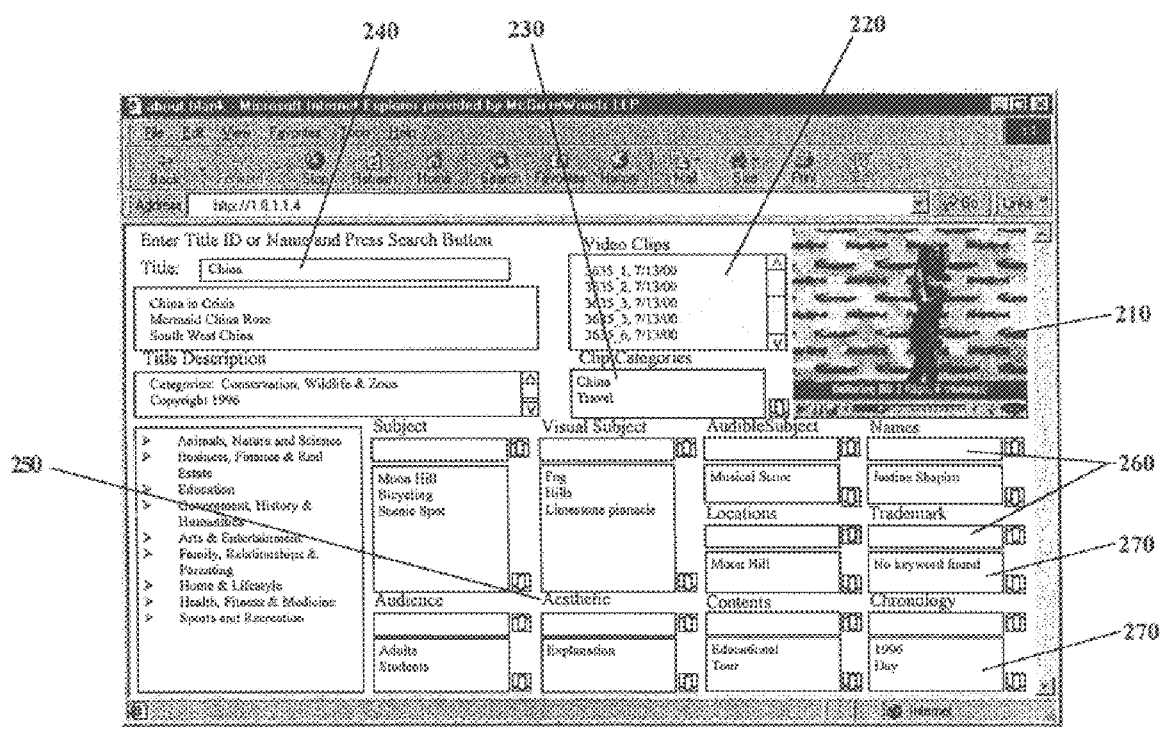
FIG. 2 is a diagram showing a graphical user interface preferred for use in accordance with the present invention. This application implements the tagging software application of the invention. This software, or middleware, uses and stores information form the content management database and can be used by editors, or other persons, to associate information about a video clip to this database. The software application has an viewer area for video that is automatically populated, or synchronized to the storage area network via communication between the SAN manager and the content management database. In accordance with a preferred embodiment, the editor would see a new clip appear in the list of clips window when the edit system creates a new clip. At that moment, the user can add information specific to the clip in the application interface.

A graphical user interface preferred for use in accordance with the present invention is shown in FIG. 2. This interface includes a clip viewer 210, window 220 for displaying information identifying previously stored clips having similar content (e.g., other clips on travel), a window 230 identifying various clip categories that may be found within the loaded video or within the database system, and a title window 240 showing the current clip category into which the video clip shown on viewer 210 has been classified.

The interface may also include information headers 250 which correspond, for example, to different nodes within a classification hierarchy used to generally classify each video within the system. These headers may include "Subject," "Visual Subject," "Audible Subject,""Names" of persons appearing in the clip, "Locations" in the clip, the existence of "Trademarks" within the clip, "Audience," "Aesthetic" features in the clip, the general category of "Contents," and "Chronology." The headers listed in the interface of FIG. 2 are merely illustrative of the invention. Those skilled in the art can appreciate that other designations may just as easily be used depending on the video subject matter being reviewed. The headers in FIG. 2, however, have advantageously been selected to apply to videos of virtually any subject matter, thereby making the invention useful in virtually any context including news, sports, education, and entertainment systems as well as many others.

The interface may also include a data entry window 260 arranged below each of the headers, as well as a window 270 for listing information (e.g., so-called "meta-tags") which has already been linked to the video clip, if the data record in the content management system for the clip is being modified by a user. In the example set forth in FIG. 2, the video clip shown on the viewer has been linked with the meta-tags "Moon Hill," "bicycling," and "scenic spot" under the "Subject" header. Other meta-tags have been provided as shown. The deletion or addition of meta-tags may be accomplished using the data entry windows.

Returning to FIG. 1, once a clip has been generated and stored, compression system 140 can be triggered, either manually or automatically, to compress 142 the video clip, now stored in the SAN network, into one or more formats. Preferably, the clips are stored in a format suitable for streaming video over the Internet. Other formats, however, may also be used, e.g., MPEG, JPEG, VIVO, etc. The converted/compressed clips are then made available through the content management system at 126 for other purposes such as web searches as well as for other tagging uses in accordance with the contextual assignment program 130. For example, a clip can be created as described in this embodiment, but tagged by an alternate operator using the contextual assignment software 130. A new record of the clip may then created, but the streaming clip 126 may still be used rather than the original source material 104. Advantageously, the SAN may connected a plurality of editing stations to allow users at remote locations to access clips stored within the system and update or modify the content information as necessary.

Figure 3:
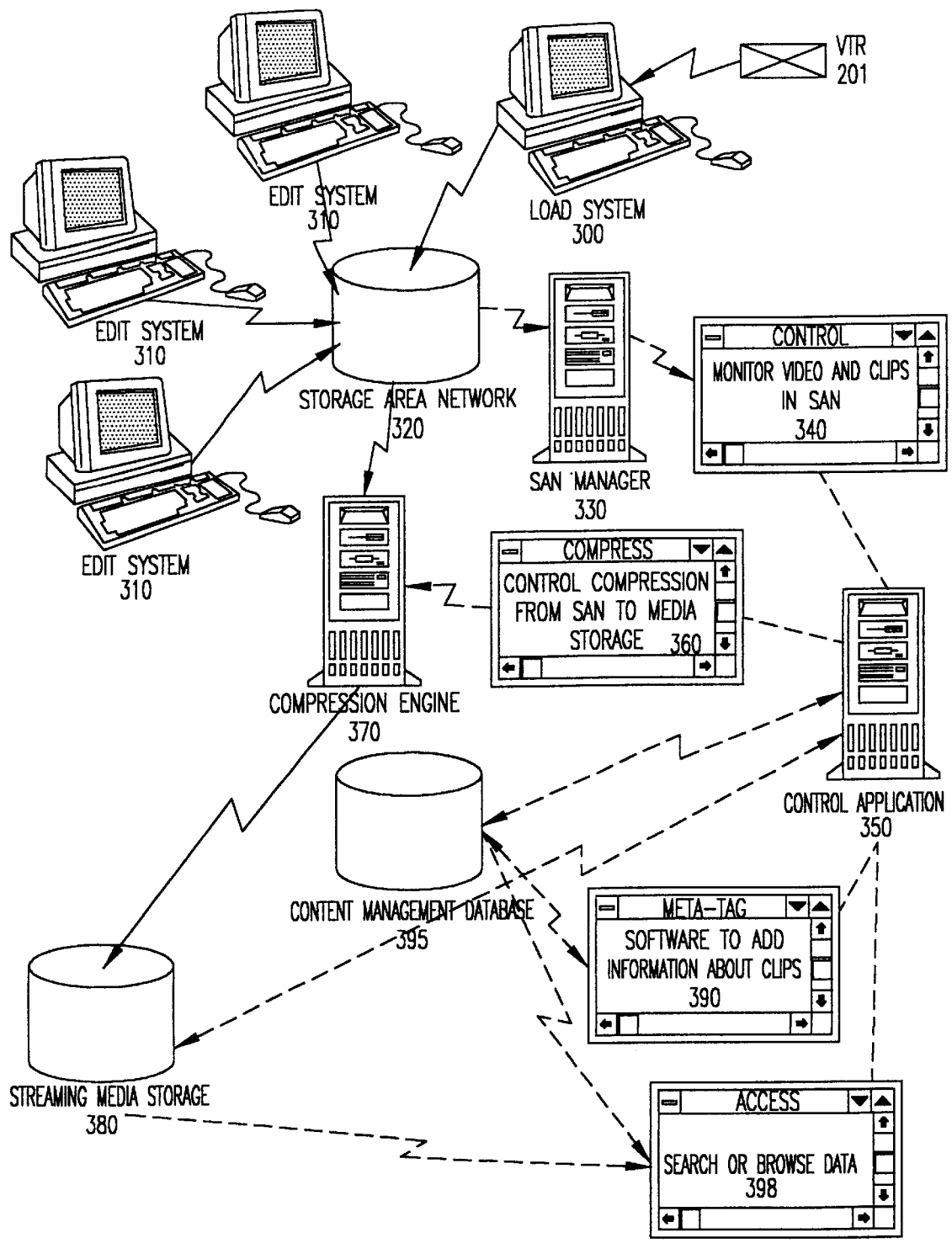
FIG. 3 is a diagram of a system according to another preferred embodiment of the present invention. In this figure, a video is loaded into a video tape recorder 301 through a loading system 300 and then the contents are stored into storage area network 320. This operation is monitored by the control application 350 which may be a collection of database middleware, for example, of the type made by Oracle Corporation. The software used to control the input of content information about the clips 390 may be run on the edit systems 310 such that the editors can reference information about the video and prepare to add information about the clips as they are editing. Once a clip has been created (a clip being one or more sequences of video), the SAN manager 330 can relay (either through a trigger mechanism or by a polling mechanism) that the clip is available. The meta-tag software 390 would then have clips available for the addition of meta-information.

FIG. 3 shows an embodiment of the invention where a SAN connects a plurality of video editing systems. As shown, this embodiment includes a video loading system 300 for receiving a video tape, a plurality of video editing systems 310 for editing the clips from the tape loaded into system 300, a storage area network (SAN) 320 linked to the video loading and video editing system, and a control application 350 loaded, for example, in a remote server. The system also includes a SAN manager 330 for managing the flow of information between the SAN and control application, a content management database 395 for storing records (including content information) tagged to the video clips stored in the SAN, a compression engine 370 for compressing video clips stored in the SAN either before or after they have been tagged with content information, and a streaming media storage device 380 for storing compressed video clips in a predetermined format, e.g., a format suitable for streaming the clip over the Internet.

The control application 350 advantageously allows the present invention to interrelate the elements of the system to form an integrated video production line. The control application may be middleware of the previously mentioned type. This middleware may include a section of code 340 for monitoring the loading of a video into the video loading system and the storage of video clips into the SAN. Another section of code 360 may control the compression of video clips stored in the SAN and the storage of those compressed clips into streaming media storage device 380. A third section of code 390 may control the tagging of video clips stored in the SAN with content (or contextual) information designated by the user on the graphical user interface, and the subsequent storage of this content information into a corresponding data record in the content management database. A fourth code section 398 may control the searching or browsing of video clips stored in the SAN based, for example, on word searches that match the content words listed, for example, in the windows 270 shown in FIG. 2.

The method of the present invention performed in accordance with the system shown in FIG. 2 will now be explained. Initially, a video tape is loaded into system 300. All or a part of the tape is then stored into the SAN. Records in the SAN and content management database are then automatically created under control of the control application program and the remaining steps proceeds in a manner similar to the process flow in FIG. 1. For example, edit systems 310 retrieve video clips from the SAN 320 and then communicate via the SAN manager 330 with the control application 350 for tagging the clips with content information using the graphical user interface. The control application schedules and coordinates this meta tagging, as well as the compression of the clips and the storage and retrieval of the meta-tagged information to and from the content management database.

The present invention may advantageously be applied to a scenario by which an editor could capture a title to, and then edit, a video clip. Using a synchronization mechanism such as an event trigger or keystroke, the editing system could "signal" the SAN manager that a video clip (or sequence) has been created. The SAN Manager could then communicate to the Content Management system the existence of the sequence. The Contextual Assignment Software could then present to the user in a near instantaneous manner, if desired, the clip for meta-tagging.

Figure 4:
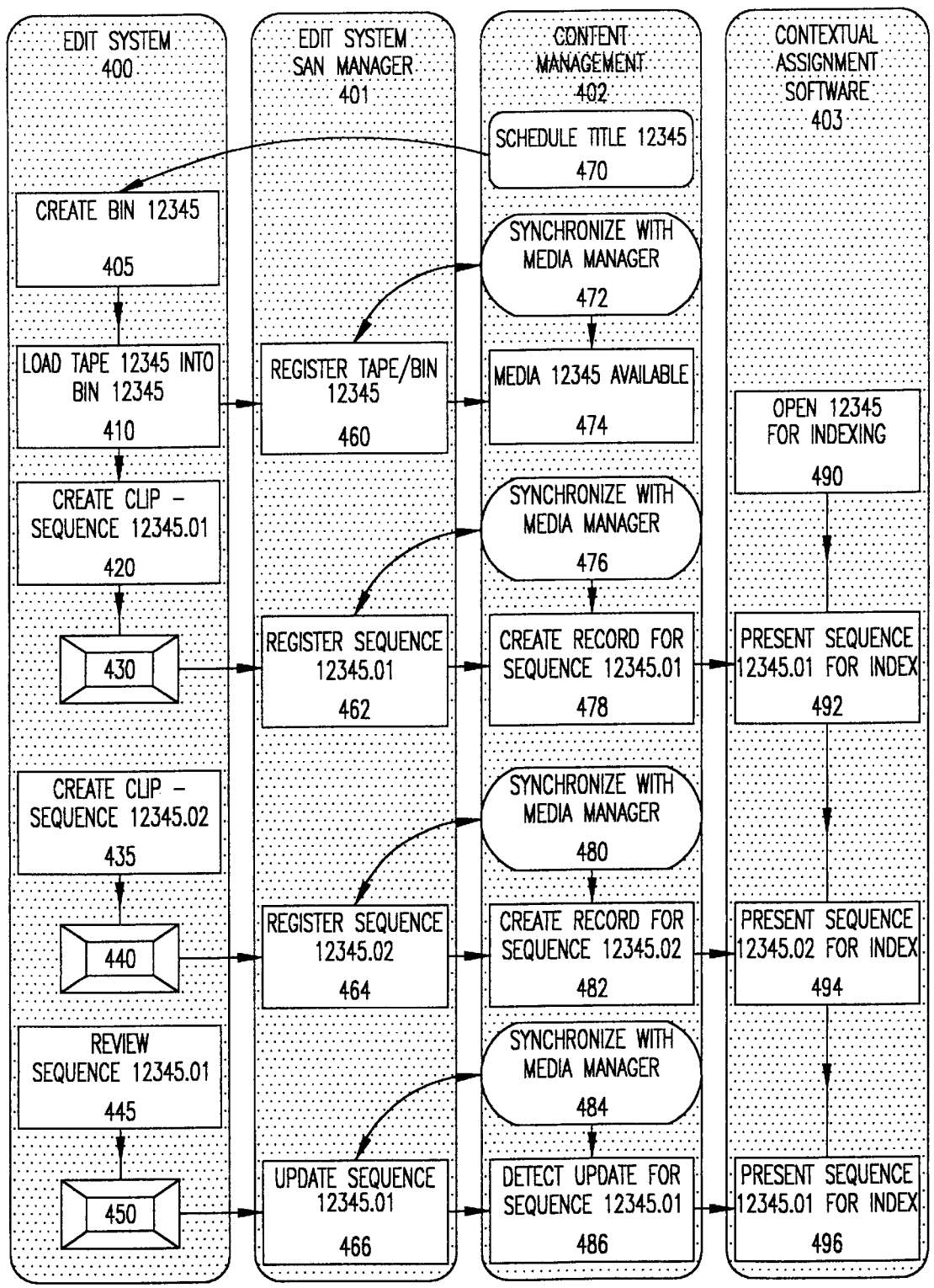
FIG. 4 is a flow diagram showing a process flow in which an editor captures a title to, and then edit, a video clip in accordance with the present invention.

Referring to FIG. 4, in the scenario mentioned above may apply to a title, e.g. numbered 12345, scheduled for processing 470 by the content management system 402. This event could either automatically, or through more manual means, create a storage location 405 on the edit system 400. Once created, the edit system 400 could load the source tape into the system 410.

Once loaded, the SAN manager 401 registers the loaded tape 460 and through either a signaling or polling operation, is synchronized 472 with the content management system, which in turn, creates a record 474 for the new media 12345 in its database. The loaded media is then opened 490 in the application software for contextual assignment 403.

An editor on the edit system 400 edits the previously loaded tape to create a new, unique video sequence or clip on the edit system 420. When this operation is complete, a signal either from an automatic or keystroke operation 430 is sent to the SAN manager to register that this sequence is complete 462. The content management system 402 then synchronizes with the SAN manager 476. This operation recognizes the new sequence and creates a new record 478 for this new clip.

Once the new clip is created, the contextual assignment software 403 can present to the user an interface to add meta-information to the newly created clip 492. The editor can continue to edit the title and create a new clip (e.g., 12345.02) on the edit system 435.

When this operation is complete, a signal either from an automatic or keystroke operation 440 is sent to the SAN manager to register that this sequence is complete 464. The content management system 402 then synchronizes with the SAN manager 480. This operation recognizes the new sequence and creates a new record 482 for this new clip. Once the new clip is created, the contextual assignment software 403 can present to the user an interface to add meta-information to the newly created clip 494. The editor can continue editing the title and create a new clip (12345.03) on the edit system 445.

When this operation is complete, a signal either from an automatic or keystroke operation 450 is sent to the SAN manager to register that this sequence is complete 466. The content management system 402 then synchronizes with the SAN manager 484. This operation recognizes the new sequence and creates a new record 486 for this new clip.

Once this new clip is created, the contextual assignment software 403 can present to the user an interface to add meta-information to the newly created clip 496. The user can continue to create new clips and associate information about this clips using this process.

The system and method of the present invention may have a number of optional features. For example, the context assignment program (i.e., tagging software) may be used at a later point in time to reference streaming video stored in the streaming video storage device 380, rather than in conjunction with the edited video visible on the edit system.

The tagging software may also be run from alternate locations. This ability enhances the process, as in some cases the tagging of clips can be enhanced with an expert in the domain of the video who may not be available to work of the material locally.

Once a clip has been created (and not necessarily tagged) the control application program may schedule the compression software to compress or convert the original clips into alternate formats. Typically, these are compressed to formats for Internet video streaming such as those by Real Networks or Microsoft. The control application for compression typically schedules these clips to be stored on a dedicated server. This streaming video data, in conjunction with a search application, may be used to find and view the video from the system.

The invention is also useful in making new media uses of traditional video. For example, one can reuse the content of a video by editing out sections of this video and making them available for viewing through mediums such as the Internet. For business reasons, it is important to make this process as efficient as possible, especially with regard to adding meta-information to the video clips in the most efficient and accurate manner possible. The ultimate re-use of video material is limited by how appropriate the meta-information is with regard to the inherent content of the video.

In an alternative embodiment, the invention takes advantage of several existing systems to build a workflow solution that allows for the efficient and accurate meta-tagging of video clips. This embodiment uses the Avid NewscutterXP systems for editing, the Avid Unity and Media Manager for a storage area network, an Oracle 8i database for content management, a custom web application for meta-tagging and the Anystream Agility Enterprise system for compression.

In sum, the present invention describes a process by which the workflow of creating video and adding information about the video has been substantially streamlined. In conventional systems, these operations are sequential rather than contiguous. By allowing almost simultaneous editing and meta-tagging, the present invention allows users to tag more contextually relevant information with the video clips they edit, since the editors who have been creating the video clips, have in their head the exact reason for the video edit. This improved accuracy will yield substantially higher quality information about the video clips compared to more linear methods for contextual assignment. This process also allows for the secondary monitoring and tagging of information about video, but this is not required.

Additionally, by allowing editors who are actively creating new clips of information to meta-tag the clips in a nearly instantaneous manner, the present invention represents a significant departure from more traditional workflows that require the video to be completely edited and exported in some manner to another system to allow for the meta-tagging process. In contrast, the present invention provide a mechanism for improving the association of information about the clip (as it is in the mind's eye of the editors at that moment) and thus reduces the overall time necessary to perform meta-tagging.

While the invention has been described in terms of preferred embodiments, those skilled in the art will recognize that the invention can be practiced with modification within the spirit and scope of the appended claims.

We claim:

1. An integrated video production system, comprising:
   a first video editing device which generates a video clip from a video;
   a storage area network, linked to the first video editing device, for storing at least one of the video and the video clip;
   a content assignment means for displaying the video clip and allowing a user to tag the video clip with content information substantially simultaneously with generation of the video clip by the first video editing device;
   a content management database which stores a record that includes said content information tagged to the video clip by said content assignment means; and
   a control application means for operatively linking said first video editing device, said content assignment means, said storage area network, and said content management database to form an integrated video-clip storage and distribution system.

2. The system of claim 1, wherein at least two of said first video editing device, storage area network, content management database, and said content assignment means are remotely located from one another.

3. The system of claim 1, wherein said content assignment means is included within said first video editing device.

4. The system of claim 1, wherein said first video editing device is linked to said control application means through said storage area network.

5. The system of claim 1, further comprising:
   at least a second video editing device linked to said control application means through said storage area network, said second video editing device including a second content assignment means for adding additional content information to the video clip or for modifying said content information tagged to the video clip by the content assignment means in said first video editing device.

6. The system of claim 5, wherein said second video editing device and said first video editing device are a same device.

7. The system of claim 1, further comprising:
   a means for converting or compressing the video clip into a predetermined format.

8. The system of claim 7, wherein said predetermined format is a format suitable for streaming the video clip through a network.

9. The system of claim 1, further comprising:
   a video loading device for inputting the video into the storage area network.

10. The system of claim 9, wherein said control application means automatically creates a record in said content management database which corresponds to the video when the video is loaded into said video loading device.

11. The system of claim 9, wherein said control application means automatically activates said content assignment means when the video is loaded into said video loading device.

12. The system of claim 11, wherein said content assignment means includes a graphical user interface which is automatically displayed on said first video editing device when the video is loaded into the video loading device.

13. The system of claim 12, wherein said graphical user interface displays at least one of (a) a title of the video clip when created by the first video editing means, (b) a list of video clips previously generated from the video, (c) a list of video clips stored in said storage area network which are similar in content to the video clip, (d) said content information tagged to the video clip by said context assignment means, and (d) a window for viewing the video clip.

14. The system of claim 13, wherein said graphical user interface displays said content information in menu form.

15. The system of claim 1, further comprising:
   a means for searching through said storage area network to locate the video clip based on said content information.

16. The method of claim 1, further comprising:
   providing a video loading device for inputting a video, from which the video clip is derived, into the storage area network.

17. The method of claim 16, further comprising:
   automatically creating a record corresponding to the video in said content management database when the video is loaded into said video loading device.

18. The method of claim 16, automatically activating said content assignment application program when the video is loaded into said video loading device.

19. The method of claim 18, wherein said content assignment application program includes a graphical user interface which is automatically displayed on said first video editing device when the video is loaded into the video loading device.

20. The method of claim 19, wherein said graphical user interface displays at least one of (a) a title of the video clip when created by the first video editing means, (b) a list of video clips previously generated from the video, (c) a list of video clips stored in said storage area network which are similar in content to the video clip, (d) said content information tagged to the video clip by said context assignment means, and (d) a window for viewing the video clip.

21. A method for processing video clips in an integrated video processing system, comprising the following steps:

providing a first video editing device, a storage area network linked to the first video editing device, and a content management database;

generating a video clip on said first video editing device;

storing the video clip in said storage area network;

creating a record in a content management database in response to input of a video, from which the video clip is derived, into a video loading device;

tagging the video clip with information indicative of content of the video clip, said content information being created using the content assignment application program;

storing said content information into the record created in said creating step; and providing a control application program for linking said content information with the video clip stored in the storage area network, wherein the tagging step and the generating step are performed substantially simultaneously.

22. The method of claim 21, further comprising:

converting the video clip into a predetermined format.

23. The method of claim 22, wherein said predetermined format is a streaming video format.

24. The method of claim 21, further comprising:

searching said storage area network to locate the video clip based on said content information.

25. The method of claim 21, wherein at least two of said first video editing device, storage area network, content management database, and content assignment application program are remotely located from one another.

26. The method of claim 21, wherein said tagging step is performed in said first video editing device.

27. The method of claim 21, further comprising:

linking said first video editing device to said control application program through said storage area network.

28. The method of claim 21, further comprising:

providing at least a second video editing device linked to said storage area network;

accessing the video clip stored in the storage area network; and adding additional content information to the video clip or modifying said content information tagged to the video clip by said first video editing device.

29. The method of claim 23, wherein said accessing step includes:

searching the content management database based on said content information to locate the record corresponding to the video clip;

locating the video clip in said storage area network based on information in said record; and displaying the video clip at said second video editing device.

30. The method of claim 21, further comprising:

displaying a graphical user interface on said first video editing device, said graphical user interface including a display for displaying the video clip and means for designating said content information in accordance with said content assignment application program.

* * * * *